(12) United States Patent
Srinivasa et al.

(10) Patent No.: US 8,620,729 B2
(45) Date of Patent: Dec. 31, 2013

(54) METHODS FOR SUPPLY CHAIN MANAGEMENT INCORPORATING UNCERTAINTY

(75) Inventors: Prasanna Gorur Narayana Srinivasa, Karnataka (IN); Abhishek Bagchi, West Bengal (IN); Ankit Agarwal, Madhya Pradesh (IN); Debashree Sen, West Bengal (IN); Jyotsna Chatradhi, Orissa (IN); Manjunath Appasaheb Sindagi, Karnataka (IN); Harjindersingh Gurubaxsingh Mistry, Gujarat (IN); Namrata Dureja, Chattisgarh (IN); Nandish Jayaram, Karnataka (IN); Neeraj Motwani, Chattisgart (IN); Neha Kanchan, Uttar Pradesh (IN); Nidhi Rajshree, Uttar Pradesh (IN); Pallavi Karan, Chattisgarh (IN); Pradeep Puthuparampil, Andhra Pradesh (IN); Priyanka Sriyapareddy, Andhra Pradesh (IN); Ravi Kumar Jain, Bihar (IN); Raehan Ahsen, Chattisgarh (IN); Silpa Uppalapati, Andhra Pradesh (IN); Shruti Garg, Karnataka (IN); Siddhartha Godbole, Maharashtra (IN); Siddhartha Pandey, Uttar Pradesh (IN); Sougato Chakraborty, West Bengal (IN)

(73) Assignee: International Institute of Information Technology, Bangalore (IN)

( * ) Notice: Subject to any disclaimer, the term of this patent is extended or adjusted under 35 U.S.C. 154(b) by 949 days.

(21) Appl. No.: 11/994,957

(22) PCT Filed: Jul. 7, 2006

(86) PCT No.: PCT/IN2006/000239
§ 371 (c)(1),
(2), (4) Date: Jan. 7, 2008

(87) PCT Pub. No.: WO2007/007351
PCT Pub. Date: Jan. 18, 2007

(65) Prior Publication Data
US 2012/0035984 A1    Feb. 9, 2012

(30) Foreign Application Priority Data
Jul. 7, 2005    (IN) .............................. 903/CHE/2005

(51) Int. Cl.
*G06F 17/00*    (2006.01)

(52) U.S. Cl.
USPC ........................................................ 705/11

(58) Field of Classification Search
USPC ........................................................ 705/7.11
See application file for complete search history.

(56) References Cited

U.S. PATENT DOCUMENTS

| | | | |
|---|---|---|---|
| 6,219,649 B1 * | 4/2001 | Jameson | 705/7.12 |
| 2005/0216879 A1 * | 9/2005 | Ruhe | 717/101 |

OTHER PUBLICATIONS

Anderson et al; Model comparison and simplification; Mar. 1999; Wiley; International Journal of Robust and Nonlinear control, vol. 9, No. 3, pp. 157-181; abstract only.*

*Primary Examiner* — Thomas Dixon
(74) *Attorney, Agent, or Firm* — Laurence P. Colton; Smith Risley Tempel Santos LLC

(57) ABSTRACT

A robust method for solving in a computer, optimization problems under uncertainty including the steps of: specifying the uncertainty as a hierarchical series of sets of constraints on parameters, with the parameters restricted to each constraint set forming an ensemble, and the hierarchy of constraints, represented as mathematical sets forming a hierarchy of ensembles, said hierarchy being based on subset, intersection or disjoint relationships amongst them; utilizing optimization techniques to create effective identify minimum and maximum bounds on the each objective function, said bounds depending on the constraints comprising each ensemble of parameters and being computed for each of the assumptions about the future; estimating a volume of candidate ensembles and relating the volume to one or more information theoretic measures; and utilizing information theoretic measures to analyze and improve the candidate iteratively refine the ensembles and associated by changing a specificity of the bounds on the objective function.

25 Claims, 14 Drawing Sheets

|  | Style | Reliability | Fuel Economy |
|---|---|---|---|
| Style | 1/1 | ½ | 3/1 |
| Reliability | 2/1 | 1/1 | 4/1 |
| Fuel Economy | 1/3 | ¼ | 1/1 |

Fig_8_A

|  | Civic | Saturn | Miata |
|---|---|---|---|
| Civic | 1/1 | 1/3 | 5/1 |
| Saturn | 3/1 | 1/1 | 4/1 |
| Miata | 1/5 | ¼ | 1/1 |

Fig_8_B

AHP

|  | Final Ratings |
|---|---|
| Civic | 0.3456 |
| Saturn | 0.7621 |
| Miata | 0.1230 |

Fig_8_C

|  | Style | Reliability | Fuel Economy |
|---|---|---|---|
| Style | 1/1 | 2-5 | 3-4 |
| Reliability | - | 1/1 | 4-6 |
| Fuel Economy | - | - | 1/1 |

Fig_9_A

|  | Equations |
|---|---|
| Constraint1 | a00 + 2a02 <= 20 |
| Constraint2 | 3a01 + 2a11 <= 10 |

Fig_9_B

|  | Style | Reliability | Fuel Economy |
|---|---|---|---|
| Style | 1/1 | 2.8 | 3.5 |
| Reliability | 1/(2.8) | 1/1 | 5.2 |
| Fuel Economy | 1/(3.5) | 1/(5.2) | 1/1 |

Fig_9_C

Summary Of Information

Number of Iterations : 1000

| Num. Of Equations | Num. of Success | Num. of Bits | Relative Volume of.. | Minimum | Maximum |
|---|---|---|---|---|---|
| 19 | 45 | 4.47 | 0.06 | 2965.0000600000... | 6786.49985 |
| 17 | 50 | 4.32 | 0.05 | 1615.0 | -1.0 |
| 15 | 50 | 4.32 | 0.05 | 1315.0 | -1.0 |
| 13 | 50 | 4.32 | 0.05 | 635.0 | -1.0 |
| 11 | 52 | 4.27 | 0.05 | 635.0 | -1.0 |
| 9 | 52 | 4.27 | 0.05 | 500.0 | -1.0 |
| 7 | 58 | 4.11 | 0.06 | 500.0 | -1.0 |

Figure 14

METHODS FOR SUPPLY CHAIN MANAGEMENT INCORPORATING UNCERTAINTY

BACKGROUND

1. Field of the Invention

This invention relates to a rich expression of data used in supply chain management, multi-criteria ranking, real-time auctions and risk assessment.

2. Discussion of Prior Art

Prasanna et al [1] applies linear constraints to traffic problems in telecommunication. It does not discuss information content, and does not contain any reference to Supply Chains. Stochastic Programming Shapiro et al [2], Shabbir Ahmed et al [3] and robust programming Bertsimas and Sim [7] are two classical techniques for handling uncertainty in algorithms, based respectively on minimizing the expected value of a metric, and/or a worst case value (or a weighted combination of the two). In SP, a probabilistic formulation of the world is used, and single/dual stage optimization (with recourse) can be used to optimize expected and/or K'th percentile (e.g. $90^{th}$ percentile) values of the size, capacity, cost, etc. The results are dependent on the probability distribution assumed, which is difficult to estimate in practice. As opposed to this, robust programming assumes a set of scenarios, and optimizes the worst case value of the metric over the set of scenarios. Even in RP, generating the set of scenarios is a difficult task. The main focus of Shapiro and Nemirovski [4] is again on the use of probabilistic distributions and their problems and the resulting complexity. Recent work on Robust optimization can be found in [5], [6], [7], [8], but neither applies linear constraints to model detailed economic behavior, nor quantifies information content. The methods developed by Bertsimas and Sim [7], by imposing a controllable amount of uncertainty in the input data, do not treat all the kinds of uncertainty we deal with here.

Our work has shown the capabilities of linear constraints to incorporate meaningful economic behavior (substitutive/complimentary behavior) and given a quantitative information theoretic interpretation. Our linear constraints are able to incorporate much richer economic information compared to [7] and [8]. Gan et al [9] only deals with complexity of supply chain based on probability distributions of various parameters and does not do design and optimization, and also does not have hierarchical constraints. The present invention incorporates the ideas of hierarchical constraints and does both design and optimization. Recent work on reverse auctions [10] does not incorporate uncertainty in benefits, which our model deals U.S. Pat. No. 758,509 deals with using customer forecasted demands to forecast the direct material to be used for production of products in accordance with the customer forecasted demands by a supply chain server. But our model does not use demand forecasts. We rather use a hierarchy of linear constraints to determine the optimal demand of material required to meet the demand of the products in the end market. Our model also takes into consideration the uncertainty in the demand of products. U.S. Pat. No. 191,910, U.S. Pat. No. 155,175, U.S. Pat. No. 735,634, U.S. Pat. No. 611,253 and other patents also talk about using forecasting and predicting the values of demand but they essentially do not use our information theoretic constraint based approach.

SUMMARY OF THE INVENTION

It is an object of this invention to provide a method, system and computer program allowing a novel representation of uncertainty in general algorithms, to systems like supply chains, multi-criteria ranking like the Analytical Hierarchical Process, Real Time Auctions, Risk Assessment etc. This representation of uncertainty is intuitive and easy to use, does not rely on estimations of probability densities, and can be used to obtain answers of interest to decision makers fairly quickly. It is another object of this invention to quantify the amount of information corresponding to any set of assumption computed using information theoretic principles.

The method of the present invention uses a hierarchical representation of information in the form of linear constraints amongst the unknown parameters. At the top of the hierarchy, the least information is assumed to be known about the world. Adding more constraints, enables the uncertainty to be successively reduced. At each level, using linear and/or nonlinear programming, we can obtain bounds on any metric of interest, e.g. dimensions, cost, profit, etc. The amount of information in any scenario (both specified in the input parameters and output metrics) can also be quantified using concepts in information theory. The method is outlined and several major applications illustrated.

The invention extends earlier work to incorporate uncertainty in a wide variety of algorithms, and discusses software systems based on this representation. These extensions to the uncertainty representation in the present invention include methods to input market behavioral information in terms of linear and/or nonlinear constraints on uncertain parameters, as well as a quantification on the amount of information used, based on information theoretic principles. Our methods present bounds on metrics of relevance, based on the amount of information available. We present increasingly tight bounds in a sequence, from the most uncertain scenario to the least—a form intuitive to decision makers.

When applied to supply chains, the traditional specification of supply/demand/inventory point estimates can be replaced by intuitive specification of aggregate supply/demand/inventory estimates, as well as expected market behavior, either at the micro and macro level. The supply chain design/analysis/optimization can be done on the basis of quantified amounts of information content in the supply/demand/inventory assumptions. A hierarchy of answers based on increasing and quantified amounts of information can be obtained, in a form useful to decision makers. Designs based on ad hoc gravity models etc of demand are not required.

When applied to multi-criteria ranking using methods like the Analytical Hierarchical Process (Saty), the entries in the node/criteria matrices need not be constants, but can vary in a correlated fashion. Hence rankings can be done without requiring the user to completely determine their relative preferences, as long as the user is able to perform some rough estimates of where a ranking relative to another possibly different ranking lies.

When applied to auctions, the asks/bids can be made in the presence of uncertainty regarding users' valuations. Limited information about these valuations can be incorporated in the form of linear/nonlinear constraints involving them.

BRIEF DESCRIPTION OF DRAWINGS

FIG. 14 shows the relation between the constraint equations and the information content represented as the number of bits.

DETAILED DESCRIPTION OF PREFERRED EMBODIMENTS

The key aspect of our invention is a novel and intuitive way of representation of uncertainty in algorithms. It is applicable to a wide variety of applications, including supply chain management (SCM), financial auctions, multi-criteria ratings—e.g. Saty's AHP, credit-risk assessment, etc.

Uncertainty in general implies imprecision—parameters cannot be exactly specified, and are free to vary in some region. Each set of the parameters in the region is called a scenario. Depending on the amount of uncertainty, the varying parameters will create a small/large ensemble of scenarios, which our invention handles in a very natural manner.

Our method is similar to robust programming (RP), but, unlike most versions of RP applied to SCM, handles an infinite (countable or uncountable) number of scenarios. In addition, an important difference between our method and RP is that partial information about the scenarios can be used to get useful answers. The set of scenarios characterized by partial information, encompasses an ensemble of scenarios. Our method enables optimization over this ensemble, producing robust solutions. While the set of scenarios used in RP is also an ensemble, our ensembles are created naturally by a specification of structurally meaningful information about the optimization problem, from the coarsest specification to the finest.

Finally, quantitative estimates of information content in the input data and outputs are available, yielding quantitative estimates of the robustness and "quality" of the solution. The same quantification is a powerful lever: it can be used to migrate the solution towards other desired goals exemplarily while keeping the quantified information assumptions constant/increasing/decreasing it.

Below we describe the generic representation of uncertainty, and follow with descriptions of how it is applied to supply chains, AHP, and auctions.

Figure 1:
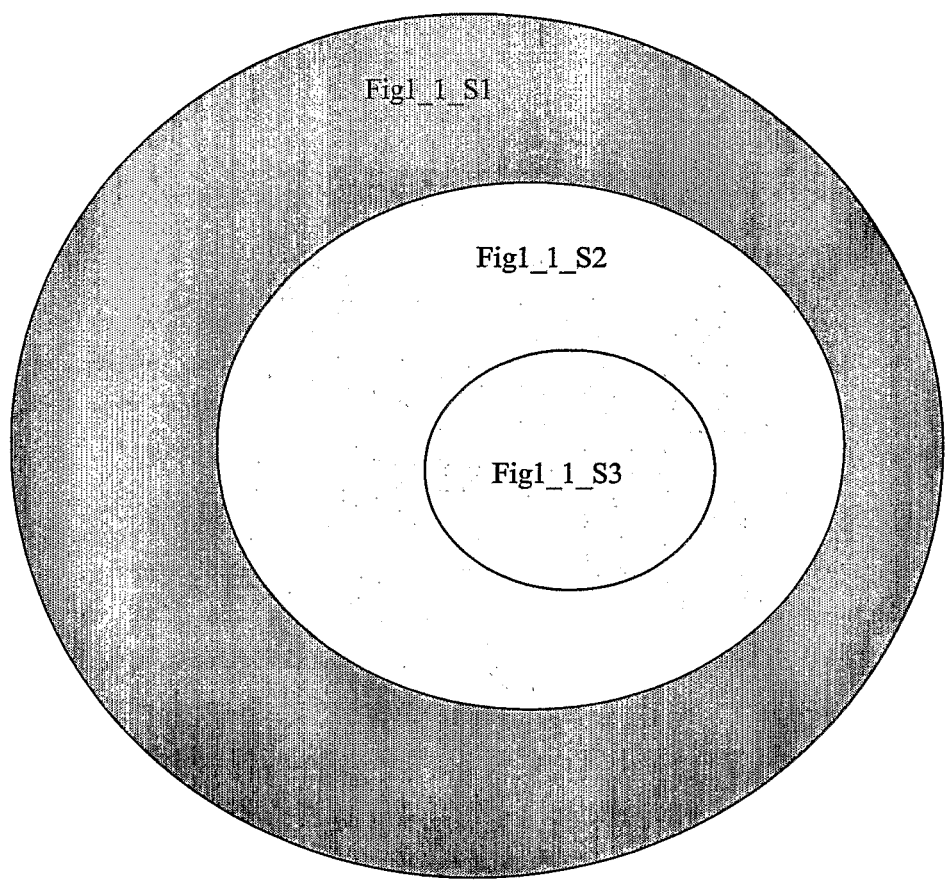
FIG. 1 shows a hierarchical representation of information.
Figure 2:
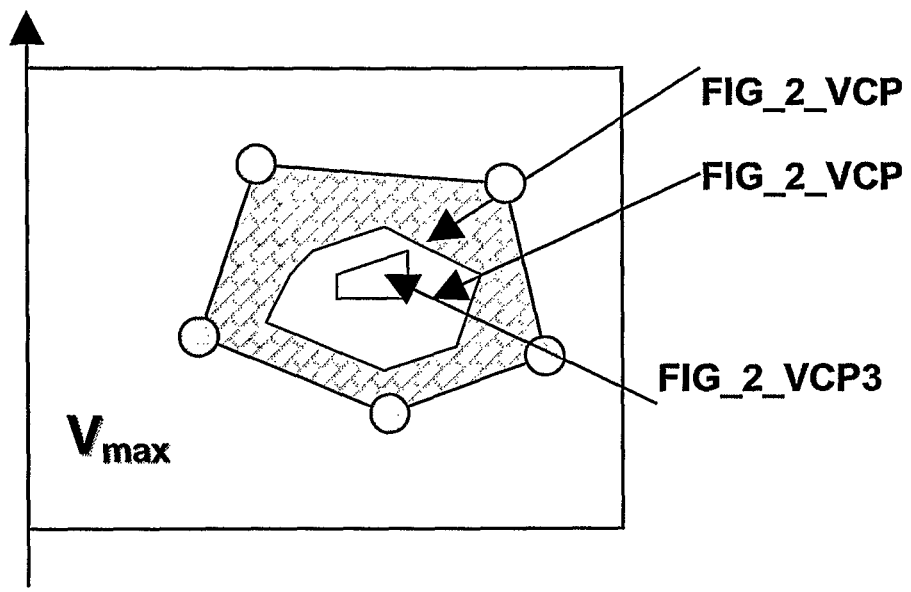
FIG. 2 shows a hierarchy of information in form of linear constraints.

FIG. 1 illustrates a hierarchical specification of information/uncertainty, which is central to the present invention. Any design or optimization problem, is driven by input data which will be referred to as parameters. A full specification of these parameters enables classical algorithms to be directly applied. Unfortunately, in many real-world problems, a full specification of these parameters cannot be given, since it requires guesses to be made about the future, measurement errors, etc. At best a whole ensemble/range of parameters can be specified. Smaller ensembles/ranges imply more information. A hierarchy of information can be created based on the hierarchy of ensembles, as shown in FIG. 1.

FIG. 1 shows a hierarchical representation of information with three ensembles of scenarios FIG_1_S3 being a subset of FIG. 1_S2 in turn being a subset of FIG_1_S1. In the language of robust programming, FIG_1_S1, FIG_1_S2, FIG_1_S3 represent successively smaller ensembles of scenarios (they can all have infinite number of scenarios). The specification of these ensembles is exemplarily based on intuitive linear constraints. The invention describes the nature of these constraints, how important information can be incorporated using these constraints, and algorithms to handle design/optimization problems with such constraints.

We describe the theory relating to representation of this information in the sections below:

Theory Relating to Information Representation:

The present invention specifies information (parameters for any optimization problem e.g. a supply chain, graph problem, etc) as convex polytopes and is called the Convex Polyhedral Specification. The set of N uncertain parameters is denoted by U. In a deterministic formulation of algorithms, U satisfies, U=D, with D being a deterministic N-vector. Stochastic programming formulations generally treat U as a stochastic N-vector, with a given mean and covariance matrix. In the present invention, convex polyhedral formulation bounds U inside a convex polyhedron CP, U∈CP. This polyhedron CP is specified by linear constraints on the variables.

In most cases, solving for the optimal solution in this formulation is very difficult. However, Linear Programming allows us to determine bounds on performance of any metric given one or more solutions. These solutions may have been obtained by ad-hoc or other heuristics. An ensemble of such solutions enables us to find tight bounds for the metrics encountered in various classes of optimization problems. Many classical problems can be generalized and solved using such a representation of uncertainty.

The hierarchy of linear constraints, specifying increasing amounts of information (reduced uncertainty), is shown in FIG_2, where the volume $V_{CP1} > V_{CP2} > V_{CP3}$, with the maximum information being specified in FIG_2_VCP3 (the volume is a generalized notion of volume, since the convex polytopes can have both continuous and discrete dimensions). In the language of robust programming, FIG_2_CP1, FIG_2_CP2, FIG_2_CP3 represent successively smaller ensembles of scenarios (they can all have infinite scenarios). The specification of these ensembles is based on intuitive linear constraints. The techniques used in the present invention enable tight bounds to be produced under this hierarchy of information, bounds typically getting tighter as we add more constraints. Note that no probabilities densities are required for this exercise (they can be added if desired for other purposes).

Figure 3:
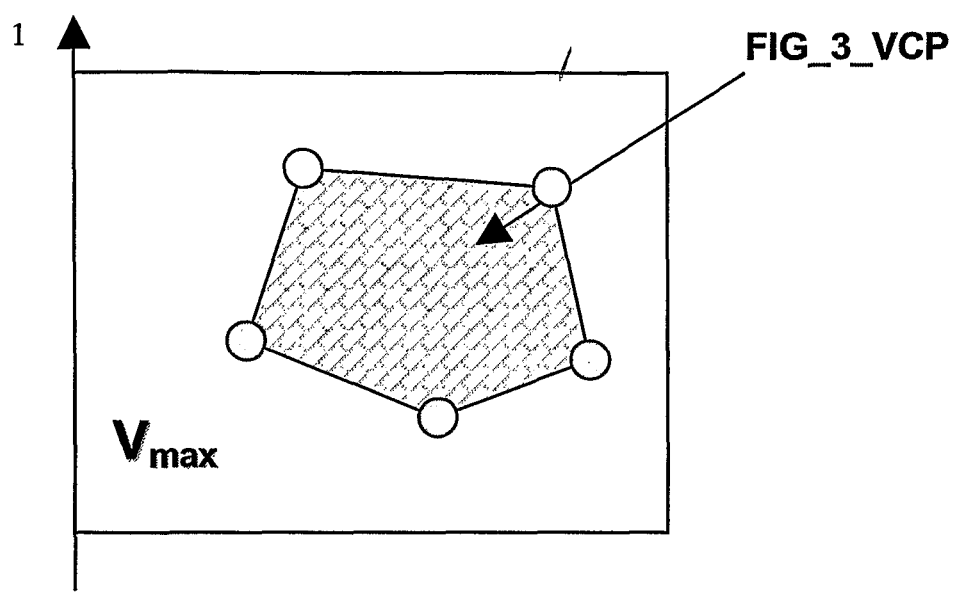
FIG. 3 shows Information Content in a Polyhedron.
Figure 4:
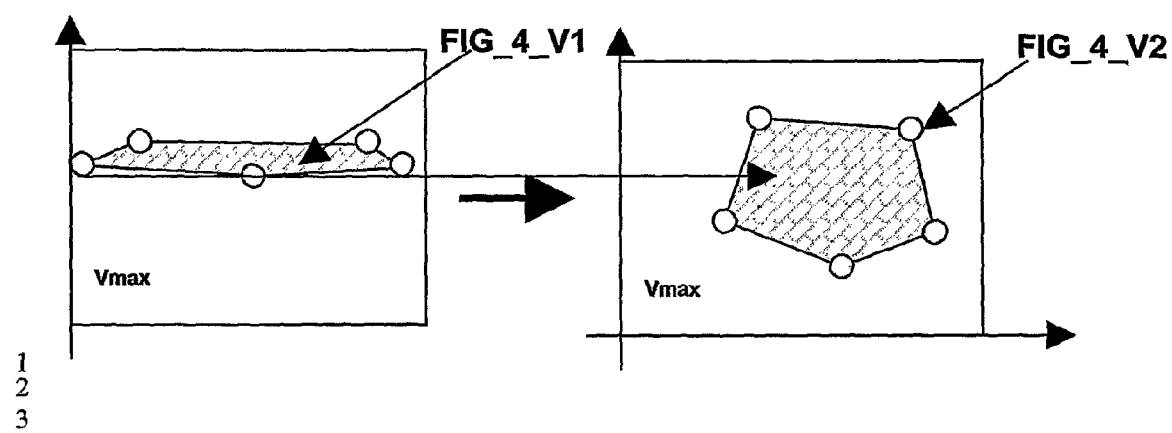
FIG. 4 shows a change in polyhedral volume as the constraints are changed.
Figure 5:
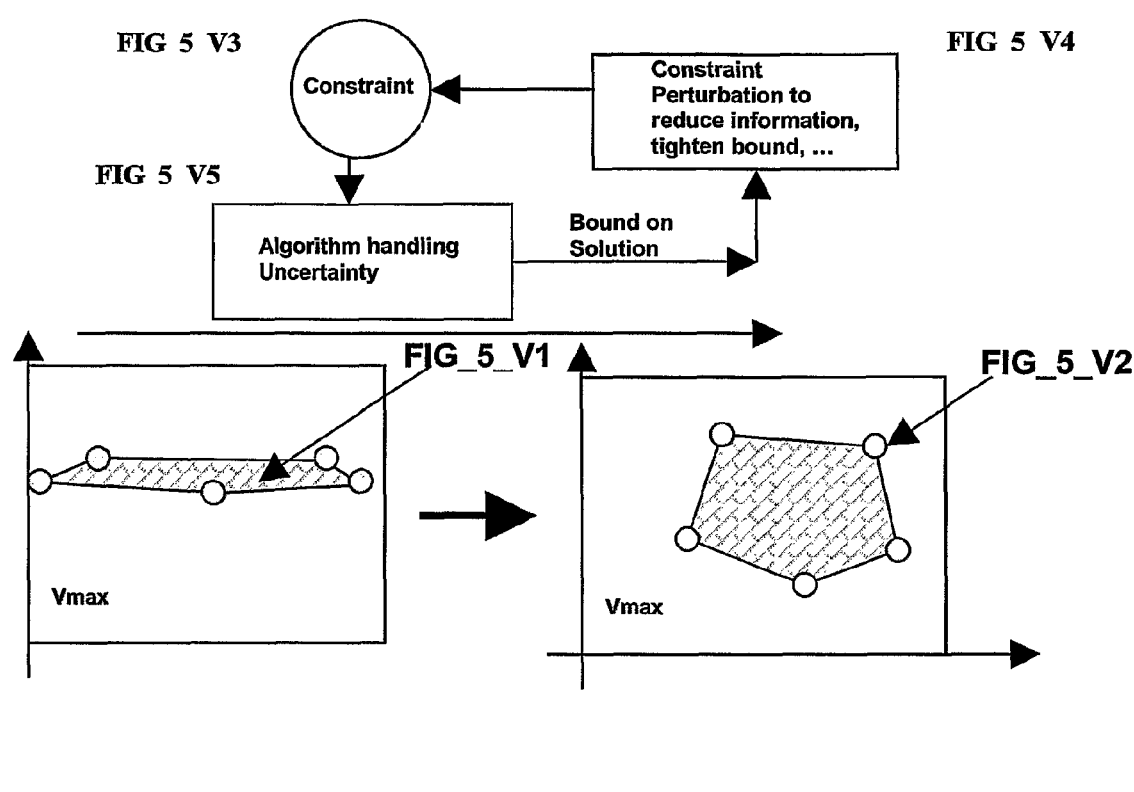
FIG. 5 shows how robustness can be Increased by increasing constraint volume in a non-linear case
Figure 6:
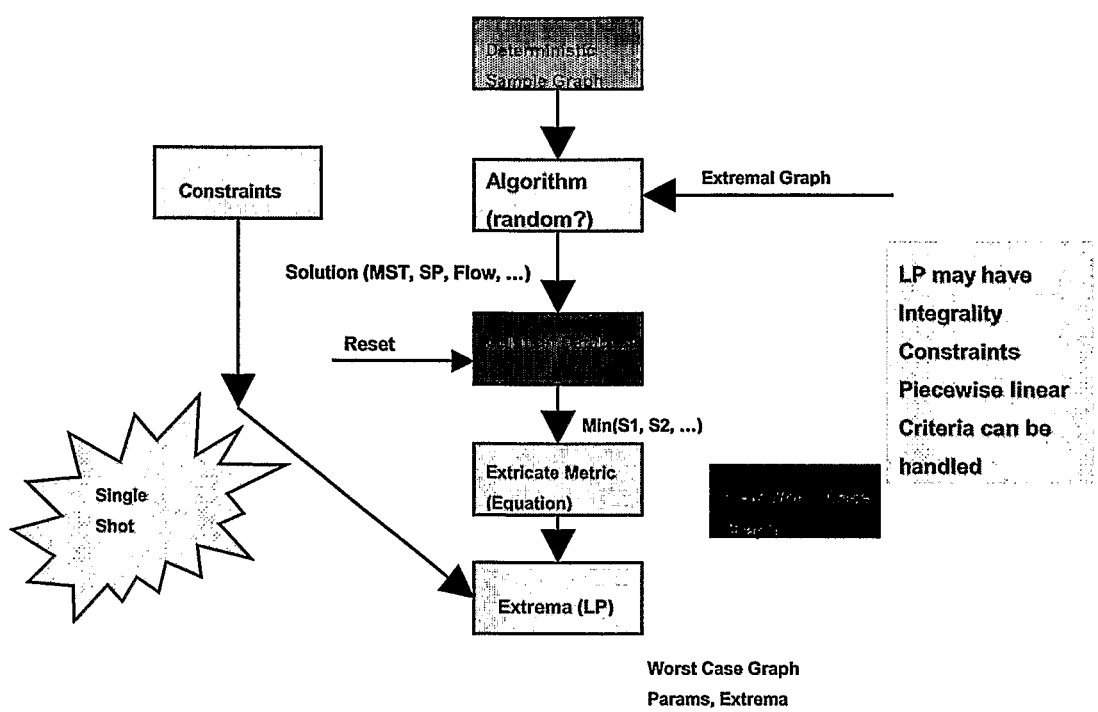
FIG. 6 shows Procedure for Graph Problem
Figure 7:
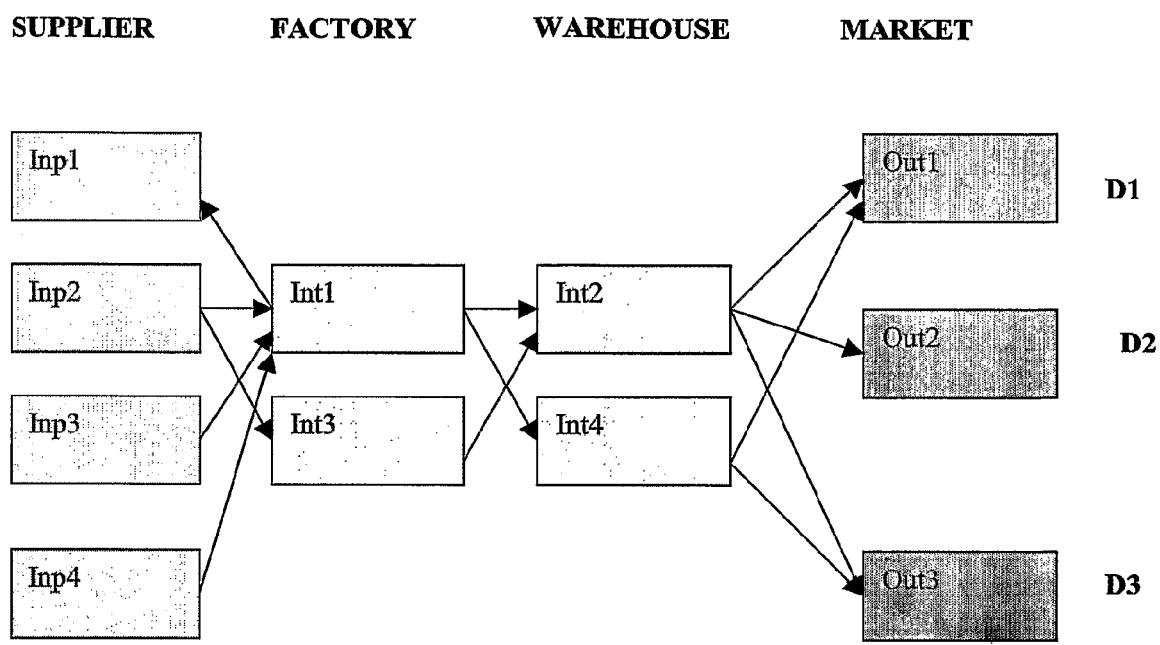
FIG. 7 shows a generic supply chain.
Figure 8:
FIG. 8 shows a generic AHP solution using Saty's approach
Figure 8:
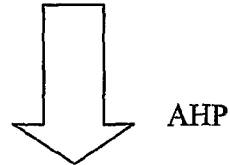
Figure 9:
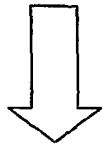
FIG. 9 shows an AHP solution using the approach outlined in the present invention

An information theoretic quantification of the amount of information specified by linear or nonlinear constraints can be developed as follows. In the lack of information it can be assumed that the parameters vary with equal probability in a large region R (taken to be of finite volume for simplicity initially), of volume $V_{max}$. FIG. 3 depicts the information content in a polyhedron, of volume FIG_3_VCP relative to a total volume (not necessarily rectangular) $V_{max}$ The constraints specifying the convex polyhedron CP specify a subset of the region R, of volume $V_{CP}$. The amount of information provided by the constraints specifying the convex polyhedron, can be equated to $$I = \log 2\left(\frac{V_{max}}{V_{Cp}}\right) \text{ in bits} \quad (1.1)$$

For a small number of constraints specifying CP, $V_{CP}$ is typically large, and the amount of information input is quite small compared to specifying each parameter completely—(see Equation 1.3 below). The amount of information reduction is quite substantial compared to a full specification of all parameters, and the answers can be more robust to forecast errors.

Note that Equation (1.1) is meaningful even if the constraints are nonlinear, the region CP is composed of disconnected regions (non-convex), etc. It is also valid when some of the parameters are discrete and some continuous, with an appropriate definition of "volume". For parameters which are discrete, the contribution to volume is evaluated by summing along the corresponding dimension. For continuous parameters, integration is used along the corresponding dimension. Hence all volumes (Vmax, Vcp) can be evaluated as:

$$V = \sum_{X_{1i},K,X_{rj}} \int_{Y_1,K,Y_s} dY_1, K, dY_s \quad (1.2)$$

Where the discrete parameters are $X_1, X_2, \ldots, X_r$, and the continuous ones $Y_1, Y_2, \ldots, Y_s$. Hybrid partially discrete and partially continuous parameters can be handled by using delta functions for the discrete portions, and integrating. In passing, we note that Equation (1.2) can be generalized for the case where the parameters are not equiprobable everywhere, by weighting the term inside the integral/sum by the appropriate multi-dimensional probability density.

To develop some intuition, consider the case when all the N parameters vary independently, with the $k^{th}$ parameter restricted to be inside an interval of size $L_i$ in the absence of information, and $l_i$ in the presence of information (constraints), the Equation (1.1) reduces to $$I = \log 2\left(\frac{\prod_i L_i}{\prod_i l_i}\right) \sum_i \log 2\left(\frac{L_i}{l_i}\right) \quad (1.3)$$

Which is the sum of the number of bits required to specify each parameter to within an accuracy of $l_i$ units, relative to a maximum range of $L_i$ units. Clearly Equation (1.1) is a generalization of the intuitive estimate of information content in specifying N-parameters to a specified accuracy for each.

The absolute amount of information provided depends on the size of the large region R, wherein the parameters vary in the absence of information. In some cases, this may be difficult to determine, without implicitly make ad-hoc assumptions about the state of the world in the absence of information. In such cases, we can still compare the information content two different constraint sets $CP_1$ and $CP_2$, by comparing their relative volume $$I_1 - I_2 = \log 2\left(\frac{V_{CP2}}{V_{CP1}}\right) \quad (1.4)$$

Clearly this formula is valid for arbitrary constraint sets $CP_1$ and $CP_2$, each of which is composed of a set of disconnected possible non-convex subsets.

Use of Equations 1.1 through 1.4 requires the fast evaluation of volumes of convex polyhedral sets, for which several techniques are available, ranging from transform techniques Lasserre[13] through fast sampling techniques. Given that the volumes in the present invention are aggregates over partially discrete and partially continuous sets, sampling techniques are preferable in general.

The volume of a convex polytope, which specifies the constraint set or assumptions, can be modified by changing the linear constraints. Polyhedra which have very sharp corners, can exhibit large changes in volume with small changes in the constraints as shown in FIG_4. FIG_4_V1 has a much smaller volume than FIG_4_V2. The information introduced in this case quantifies the difference between the constraints as represented by $CP_1$ in FIG_4_V1 and the constraints $CP_2$ applied to FIG_4_V2. This offers the opportunity to increase the robustness of an answer derived under one set of constraints $CP_1$, by changing the constraint set slightly to $CP_2$, and increasing the volume of the constraint set. This procedure makes a thin polyhedron "fat", and the resulting increase in $V_{CP}$ reduces information under which the algorithm's results are derived, making them more robust.

In FIG_5, FIG_5_V3 represents a set of constraints which can be changed for various reasons. Using linear programming or other methods the algorithm in FIG_5_V5 provides the capability to find the worst case performance of a particular solution under the constraint set FIG_5_V3. Constraint perturber FIG_5_V4 (which can be random perturbations, or specifically devised to increase volume), changes the constraints FIG_5_V3 to increase volume and hence robustness. The procedure is repeated till acceptable robustness is obtained. This procedure can be used with non-linear constraints also as shown in FIG_5.

Clearly, the constraint set can be changed for other reasons than robustness. For example, in certain business contexts, the uncertainty represented by certain constraints can be more desirable than others—e.g. uncertainty in the main supply/product lines can be significant for the business, while the same in the secondary supply/product lines need not be. Thus replacing a set of constraints involving main supply/product lines by another on secondary supply/product lines, may be desirable for the firm. This transformation can be done keeping the total information content as quantified above the same, more, or less. Similar techniques can be applied in real time trading—e.g. auctions—bidders/sellers can make their bids on the basis of different sets of uncertainty assumptions, and the price is set based on a variety of optimization criteria over each individual entity's uncertainty set.

Another viewpoint on this procedure is to get the input constraint set CP with the largest volume, which keeps the outputs in a specified region of output parameter space. This is equivalent to finding the minimal set of input information which yields a given output or output region—a minimal "feature set".

Changes in the constraints may make the optimization problem easier to solve.

The information content in the outputs (answers of the optimization) can be found analogously to Equation (1.1), by characterizing the bounds on each output in the absence of constraints and also in their presence. Unfortunately, for many interesting algorithms, the output does not vary in a linear fashion with the inputs. For algorithms with multiple outputs, the outputs do not in general lie in a convex polytope, even if the input does. To evaluate the generally nonlinear output volume, Pareto surface estimation techniques are required in general.

In general, different outputs specify various ways of combining inputs. These different input combinations can be viewed as different functionals on the allowable space of input parameters (the convex polytope for linear constraints). The range each functional is allowed to take can be viewed as a "length" of the convex polytope along an appropriate projection.

As such, if the number of different independent outputs is the same as the number of different inputs the product of all these different lengths corresponding to different outputs measures the volume of this same polytope in possibly a biased fashion. Hence the product of all these different lengths (the output volume) is constant, and equal to within a constant factor the product of the ranges of all the inputs (the input volume). This can be viewed as a formulation of Shannon's Information Theory results to algorithms, which are generally singular transformations in the terminology of Shannon's classic 1948 paper "A mathematical Theory of Communication".

Method of Optimization Under Uncertainity

Our formulation of uncertainty enables succinct specification of an ensemble of input data, a data representation form which cannot be handled by classical algorithms. A few constraints on the input data can include thousands of different data sets, even for very small problems.

To handle generic algorithms/optimization using such a specification is quite difficult, even using the recently developed techniques of convex optimization [5,8]. Our method works as follows 1. An optimal solution (i.e. a solution for which a metric (a function of uncertain parameters) is maximized) for a random allowable set of input data is determined, using standard algorithms without uncertainty.
2. The worst case performance of this solution for the complete ensemble of possible input data is determined, together with the corresponding worst case input data. If the metric to be optimized is linear in the uncertain input data, this worst case input data can be determined using Linear Programming.
3. If step 2 does not result in acceptable performance, another solution is generated by either
   a. Perturbing the original solution (e.g. randomly changing it).
   b. Computing a new solution, which is optimal at the worst case input data determined in step 2.
4. Step 3 is repeated till a solution with an acceptable value of the metric is found, or till the set of all solutions found jointly have an acceptable value of the metric. The word jointly means that for every candidate input dataset allowed by the constraints, we choose the solution which has best metric, given this candidate dataset This last step can be done using linear programming for linear metric.

The steps 1, 2, and 3 can be used—a new path is repeatedly determined using either random perturbation of an original path (step 3a), or using Dijkstra on a graph satisfying the constraints, for which the original path turns out to be long. Step 3 is repeated till an acceptably short path is found, or till the set of all solutions found jointly have an low enough distance. The word jointly means that for every candidate graph allowed by the constraints, we choose the path which has the lowest length given the weights of the edges of this candidate graph. This last step can be done using methods well known in linear programming.

EXAMPLE 1

Supply Chain Management

A supply chain necessarily involves decisions about future operations. However, forecasting demand for a large number of commodities is difficult, especially for new products. Our method extends the state-of-art by specifying linear constraints (bounds, correlated bounds (see below), etc) on demand variables, supply variables, production variables, warehouse capacity variables, etc. The number of linear constraints is typically much smaller than the number of total variables. In addition, since these constraints are typically on aggregates, the uncertainty in them is typically less than that on the individual variables. Our algorithmic approach deals with the constraints directly, and is powerful enough to represent and handle many classes of uncertainty, some of which are outlined in Table 1:

TABLE 1

Classes of uncertainty and their representation

| Class of Uncertainty | Representation Details |
|---|---|
| Demand Uncertainty represented by constraints on the externals to the supply chain | Bounds on min/max of each demand Bounds on sums/differences of demands (aggregated demand/competitive demands) Bounds on weighted sums/differences of demands (revenue/profit/ . . . ) |
| Supply chain uncertainty | Individual Capacity of Nodes (set of production sites), or links (communication facilities) Aggregated Capacity of Nodes (set of production sites), or links (set of communication facilities) Tracking capacity of Nodes/Links - capacity of some nodes/links may be related A set of candidate structures for the chain |
| Market Uncertainty | Total Demand over time Regional aggregation constraints |

FIG_7 shows a generic supply chain. Inputs to the chain are from (Inp1, Inp2, Inp3, Inp4), intermediate production stages (Int1, Int2, Int3 and Int4), and final output stages (Out1, Out2, Out3). The output of the final stage serves markets with demands D1, D2 and D3. Traditionally, analysis, design and optimization of the supply chain, is made on the basis of a forecasted demands (and/or other market variables), based on prior history, including seasonally adjusted ARMA models, market surveys, etc. Estimates of possible error, and corresponding improvements to the supply chain are obtained using a variety of methods, including probabilitic/interval analysis, Stochastic Programming, Robust Optimization, etc. However all these methods require ad-hoc forecasts to be made, and do not give global bounds on performance, or globally robust designs.

The instantiation of our invention for this supply chain offers global bounds, and robust designs, using intuitive specifications of linear constraints on demand variable. Assume that demands D1, D2 and D3 are uncertain. For concreteness, assume that d1 is demand for toothpaste of a certain brand, D2 is demand for its competitor, while D3 is the demand for toothbrushes. Then, while D1 and D2 varies, due to their substitutive behavior, the sum remains roughly constant. Exemplary system parameters that may be specified with their bounds are presented in Table 2.

TABLE 2

Exemplary System Parameters

| System Parameter | Bounds | Explanation |
| --- | --- | --- |
| Limits per Demand, e.g. for demand 1 | $Min1 <= d_1 <= Max1$ | This illustrates that while the demand $d_1$ is not a fully specified quantity, a priori knowledge about its limits is known. |
| Total Demand Limits, e.g. for demands 1, 2, 3 together | $Min2 <= d_1 + d_2 + d_3 <= Max2$ | This illustrates that while each of the demands $d_1$, $d_2$ and $d_3$ are unknown, and change within limits, they do not jointly tend to both increase and decrease simultaneously to the max/min values. This linear constraint incorporates correlation amongst the different variables (substitution effects between the variables). |
| Substitution Effects between demand 1 and 2 | $Min1 <= d_1 + d_2 <= Max1$ | This illustrates that while each of the demands $d_1$, and $d_2$ are unknown, and change within limits, they do not jointly tend to both increase and decrease simultaneously to the max/min values. This is another example of substitution effects. |
| Complementary Effects between demand 1 and 2 | $Min2 <= d_1 - d_2 <= Max2$ | This illustrates that $d_1$ and $d_2$ individually vary, they tend to track each other - these are complementary demands. For example, demand for laptops and laptop cases/ automobiles and petrol/gasoline would typically be complementary (increasing/decreasing together). |
| Weighted Total of demands are constrained | $Min <= k1\, d_1 + k2\, d_2 <= Max$ | This general constraint imposes maxima and minima on the sum of a linear combination of $d_1$ and $d_2$. For example, if $K_1$ and $K_2$ are cost/prices, total cost/revenue is constrained. |
| Supply Side Constraints | $Min <= I_1 + I_2 + \ldots <= Max$ | This constraint on the supply side, imposes a limit on total supplier capacity (assuming one/related suppliers) - the notation is that supplier k ships quantity $I_k$. |
| Supply Side Spending Constraints | $Min <= P1\, I_1 + P2\, I_2 + \ldots <= Max$ | This constraint imposes limits on total input spending, if Pi is Price of Input i |
| Supply Side Warehousing Constraints | $Min <= V1\, I_1 + V2\, I_2 + \ldots <= Max$ | This constraint implies that the total storage capacity at the warehouse storing the inputs —(these may or may not be located near them), is at least Min and at most Max. Input I requires volume Vi per unit. |
| Intermediate Stage Warehousing constraints | $Min <= V1\, Int_1 + V2\, Int_2 + \ldots <= Max$ | This constraint implies that the total storage capacity at the warehouse storing the intermediate outputs—(these may or may not be located near them), is at least Min and at most Max. Intermediate output Inti requires volume Vi per unit. |
| Total Revenue Constraints | $Min <= P1\, d_1 + P2\, d_2 + \ldots <= Max$ | If Pi is the price of product i, with market demand $d_i$, this yields limits on total revenue. |
| Limits on efficiency of the production of outputs given inputs | $Min <= d_1 - i_1 <= Max$ | These constraints refer to the "slack" in the supply chain structure - the amount of demand (output) $d_1$ which can be served from a given unit of input $i_1$, is constrained between max and min. This reflects the fact that resources cannot be either wasted, or diverted from output $d_1$ to other outputs. |
| Relaxed Flow Conservation Constraints | Min <= Sum of Input flows – Sum of Output flows <= Max! | At each intermediate supply chain stage, the total inflow need not be exactly equal to the total outflow, but within selected limits. Such constraints are useful in chemical reactor modeling. |
| Generalization to Chemical Reactors | | Output is a general (not necessarily linear) function of the inputs<br>Mass conservation holds, Volumetric conservation may not hold<br>This is an example of a generalized Multi-commodity flow with "interactions between commodities" |
| Constraints where price and quantity are both variable | $Min <= P_1 I_1 + P_2 I_2 <= Max$ | These nonlinear constraints ($P_i$ is price of input I, whose quantity is $I_i$) require quadratic or general nonlinear programming to handle them. |

The set of constraints (which define a complex polytope) imposed on the system can be changed as described therein, to exemplarily increase volume (reduce information assumptions about the future, or alternatively improve robustness), change the type of constraint (e.g. from constraints on major product lines to those on minor product lines, etc), while keeping the amount of information controlled in terms of number of bits. This process of using information quantification can be applied to both inputs and outputs (using multiple outputs).

Other Parameters (Time, Inventory)

Time can be incorporated by using variables indexed by time. Some examples of resulting constraints are given below. Assume that the demand on day i is given by d[i].

$$1400 <= \Sigma^{30}_{i=0} d[i] <= 1500$$

This constraint tell us the bounds on the demand, say d, of a commodity over a period, say one month varies between 1400 and 1500. Constraints across time-steps can be created, e.g. the constraint $$-100 <= d[1] - d[20] <= 100$$

means that the demand on day 1 and day 20 are closely tracking each other.

Inventory

The amount of inventory say, at a warehouse can be represented by the equation:

$$I[n] = x[n] - x[n-1]$$

where I[n] is the inventory at time "n" and is equal to the difference in the stock, say x, between times "n" and "n−1". System dynamic equations for the inventory at various nodes can be derived.

Capabilities of the Representation: Input at Multiple Stages, Nonlinear Metrics

The Supply Chain Structure imposes generally linear relations amongst quantities—inputs, intermediate quantities and outputs. However, this is not always true, especially when inputs, outputs, and intermediates are purchased/produced in batches (modularity). The optimization of one or more variables inputs/intermediates/outputs/profit/revenue can be obtained using (possibly integral) Linear Programming, which can be run forwards (inputs to intermediates and outputs), backwards (outputs to intermediates and inputs), and middle out (intermediates to inputs and outputs) or any combinations of these. We note that the restriction to linear constraints is not necessary, this has been used to enable the use of fast LP techniques for obtaining bounds. However, this does not preclude the use of nonlinear constraints, provided high speed solvers like conjugate gradient techniques are available. Note that the use of linear constraints does not always result in linear metrics, e.g. the cost under joint price-demand uncertainty is quadratic, but still convex.

Optimizing Supply Chain Structure

In design problems, the supply chain structure is often an entity to be optimized, and not apriori determined. In our formulation, this entails solving an optimization problem, when the input data is not fully known, but constrained to be within the convex polyhedron CP. While such optimizations are very difficult, it is possible to bound the performance of the optimal solution reasonably simply. Our technique is to populate the solution space with several solutions, and at each point, choose the solution which gives the best performance—this can be shown to be solvable by a linear program. The solutions can be generated by Creating a candidate supply chain structure for nominal values of the demand, input and other uncertain variables.

Perturbations of the "optimal" Supply Chain Structure for nominal values of demand, inputs, etc. These perturbations can be generated by a variety of Supply Chain Transformations The metric is minimized/maximized over all solutions, using an LP.

EXAMPLE 2

Analytical Hierarchical Process (AHP)

The AHP approach, which was given by Thomas L Saty [14] focuses on obtaining a set of rakings of a set of options based upon certain Criteria. Here information is decomposed into a hierarchy of Criteria and Alternatives, which is later synthesized to determine the relative rankings of the Alternatives. Both Qualitative and Quantitative Criteria can be compared using informed judgments to obtain weights and priorities. An example of this approach, to rank a set of cars based on certain user specified Criteria has been shown in FIG_8. Here, the user provides the relative ratios for the Criteria FIG_8_B and Alternative FIG_8_B matrices and obtains the final ratings FIG_8_C for the same. The user specifies the relative ratios of the alternatives for each criteria. The example illustrates this for the criteria Style. Combining the criteria matrix with the alternative matrix and applying AHP, the user arrives at a ranking.

A major issue of concern here is that the user must provide precise values for the relative ratios. However, he may not be sure about the same. The present invention addresses this by relaxing the user-requirements by allowing him to enter a range of values instead of precise ratios, FIG_9_A where in the second cell in the top row the notation 2-5 means that the relative ranking lies between 2 and 5. This does away with the errors which might have been incorporated due to user's lack of knowledge of precise ratios. In addition, the entries of these matrices could satisfy a set of user specified constraints reflecting substitutive/complementary behavior amongst the different cell elements FIG_9_B. Also, the randomly generated matrices are checked to satisfy a set of user specified constraints so that the values in the specified range cannot be simultaneously maximum or minimum.

Thus, a randomly generated matrix satisfying the constraint set specified by the user is used for the computation of final ratings. In view of the fact that the set of values generated upon random sampling is non-linear, we obtain a probability distribution of ratings.

EXAMPLE 3

Auctions

The classical auction algorithms rely on the existence of a valuation "benefit" function, which measures the benefit derived by acquiring a good of some kind. These benefit functions are difficult to specify accurately in practice, due to a variety of technological and economic uncertainties. The representation of uncertainty in the present invention enables easy specification of varying amounts of information about the benefit functions. The method of the present invention is best illustrated by looking at a small 3×3 assignment algorithm, which is fundamental to auctions.

Figure 10:
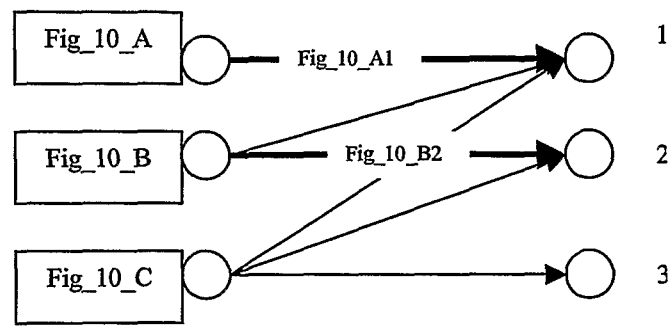
FIG. 10 illustrates the applicability of the representation of uncertainty for auctions.
Figure 11:
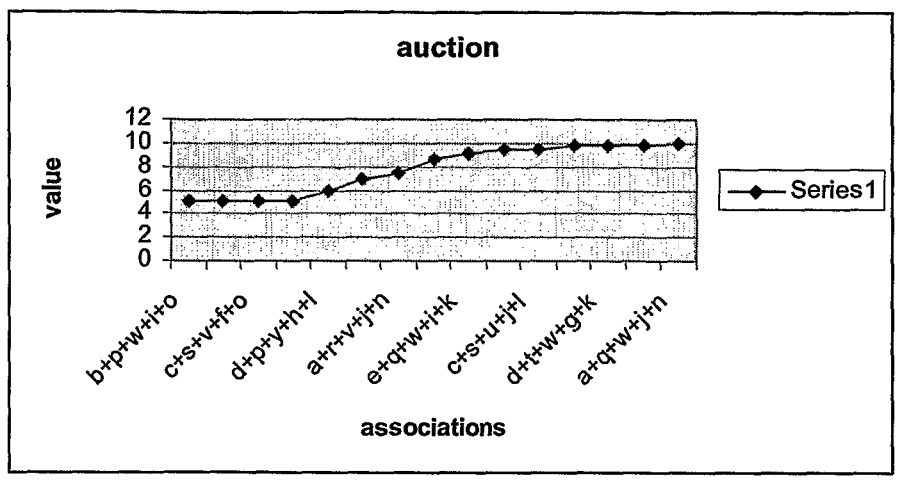
FIG. 11 shows the results of the benefits from a 5*5 Auction.
Figure 12:
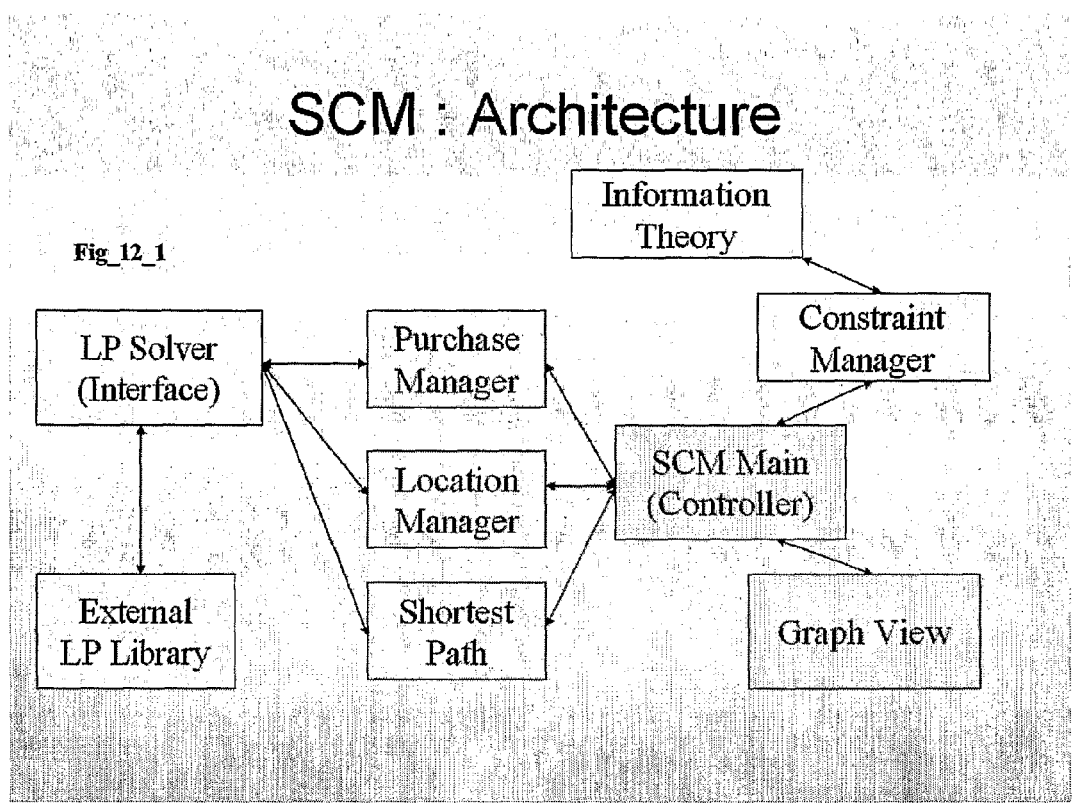
FIG. 12 shows the overall SCM Software Architecture.
Figure 13:
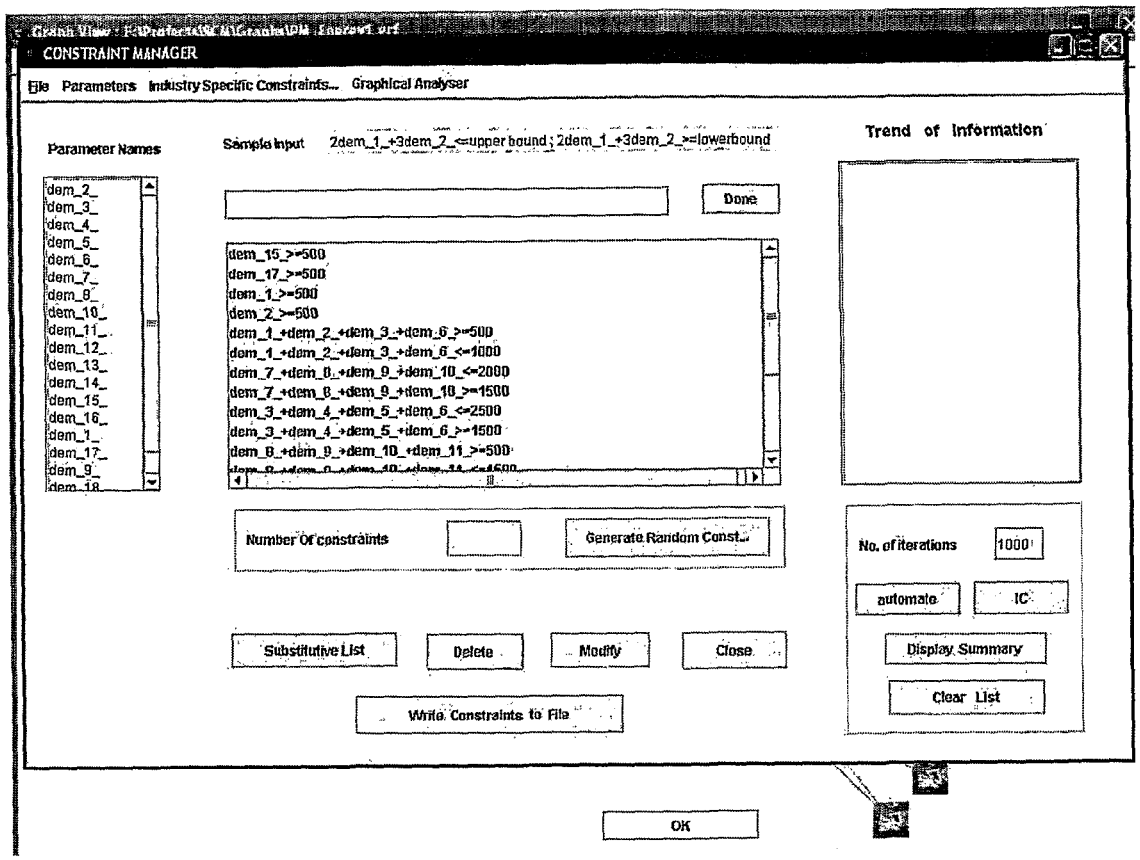
FIG. 13 shows how constraints are entered in the Constraint Wizard.

FIG. 10 illustrates the applicability of the representation of uncertainty for auctions. Entities FIG_10_A, FIG_10_B, and FIG_10_C bid for objects FIG_10_1, FIG_10_2 and FIG_10_3. The benefits by FIG_10_A acquiring object FIG_10_1 is given by FIG_10_A1, FIG_10_B acquiring object FIG_10_2 is FIG_10_B2, etc. A traditional assignment algorithm uses these benefits and finds the matching optimizing some criterion (e.g. maximizing sum of benefits).

Unfortunately these benefits are not known accurately in practice, as they depend on costs, prices, market conditions, interest rates, etc. As outlined in detail in the supply chain example, linear constraints enable controllable amounts of information to be specified about these benefits. For example, if entities FIG_10_A and FIG_10_B share some major common structure, they are likely to exhibit similar preference for objects. This complementarity can be specified as $$Min<=FIG\_10\_A1-FIG\_10\_B1<=Max$$

For example, if objects FIG_10_1 and FIG_10_2 are substitutive brands of the same product time, they are likely to exhibit substitutive behavior, specified as:

$$Min<=FIG\_10\_A1+FIG\_10\_A2<=Max$$

$$Min<=FIG\_10\_B1+FIG\_10\_B2<=Max$$

etc. The volume enclosed by these constraints is related to the Shannon self-information of the constraint set, as per Equation (1.1).

Algorithms to optimize assignments under our representation of uncertainty can begin with a set of candidate assignment and find the particular benefits, under which worst case performance occurs for that candidate ensemble. New assignments which optimize performance for these worst-case benefits are generated using techniques well-known in the state-of-art. These new assignments are added to the ensemble. For an exemplary 5×5 auction, with the following constraint set, the benefit as measured by the sum of all individual benefits, increases as we add more assignments to the ensemble from 4 to 10 (250%). FIG_11 shows the result.

EXAMPLE 4

Supply Chain Management Software

The ideas have been embodied in an SCM software package, hereafter referred to as SCM. SCM software provides the graphical user interface (GUI) to the user for solving the different supply chain problems. Users can draw a graph of the supply chain, provide different parameters and then get the optimal value. The software is completely written in JAVA and using different utilities and GUI packages provided by JAVA SDK.

The user interface provides a facility to automatically draw the graph by simply specifying the number of nodes in the graph. Users then enter the values of different parameters like type, costs for the nodes as well as the edges connecting these nodes. Users can edit, delete, copy and paste these parameters as and when they want. The graph drawn is then passed from the GUI part of the software to the core logic part, where solution is found out and sent back to the user through the GUI.

For the simplicity of the maintaining and updating/changing the software code, SCM software uses the two basic parts for any kind of the module. These two parts are:
1. Core part: This has the logic of what has to be done with the input data.
2. Interface part: This is present if Core part has to work with external packages like LP solver in our case. This makes total design flexible to have least changes in the software code even if the external package is changed.

Software also separates the GUI and the control part. The flow of the software is:

1. SCM control initiates the GUI for the user.
2. GUI part initializes and provides all facilities to the user for input and output things.
3. After user chooses which problem to solve, the control initiates the proper core part of the logic and provides the core part with the input from the user.
4. Core part interacts with the external packages if necessary through interfaces and provides solution back to the Control portion.
5. Control part gives solution to the GUI for the display.

Separate GUI and control parts in the software present the benefit that, even if GUI is updated (which is done often), the control part is not affected very much so helps again to maintain and update the software very easily. FIG_12 shows the overall architecture of the Supply Chain Software.

The concepts of information theory have been incorporated in the software by applying a novel approach to relate Information Theory with Supply Chain Management System. The concept of Information Theory uses a number of bits to represent the volume enclosed by a set of constraints (in-equations) defining a polytope. Our analysis (Showing Trend of Information) is based on the concept that as the number of constraints in a space increases the number of bits required to represent the information increases. The purpose of this module is to show the trend of information. By trend of information, we mean that the new sets used to analyze is a subset of previous set. The purpose is to find redundant constraints, if any, such that the subset represents the same information as the original constraint set. Our approach is to randomly remove some constraints from the original set such that the subset formed is consistent. Then we find the information content using the Information Theory concept.

FIG_13 shows the way in which inputs are specified to the Information Theory Module. We take a set of variables which are inherited from the input graph specified in the problem and these variables can be anything like demand of that node or maximum capacity of the node, etc. Then on the basis of these variables the user inputs set of (constraints) in-equations which must be consistent (solvable) the set must follow all the rules of consistent equations.

In real world the constraint equations can be mapped to any condition of demand and supply.

For example,

For x and y maximum supply can be 10 whereas the minimum supply can be 5

$$x+y>=5$$

$$x+y<=10$$

We can also specify number of iterations which corresponds to the number of times we want to check for solution of the constraint set. This set is passed to information theory and we get output which is represented in form of table:

FIG_14 shows the output of the Information Theory Module. Num. of success: It gives the number of attempts of success. Num. of bits: This value is returned by information theory module. This gives the number of bits that are required to represent the information contained by the polytope (represented by the input constraint set). Relative volume: This gives the volume enclosed by the polytope in space formed by input equations at various stages of operation with respect to the last set of input equations which is treated as 100. Minimum or Maximum: the solution returned by the LP solver for equation subjective to minimum or maximum.

If the system outputs −1 as a result, this implies that the input equation is not consistent, i.e., it is not solvable for that particular set.

REFERENCES

[1] G. N. Srinivasa Prasanna, *Traffic Constraints instead of Traffic Matrices: A New Approach to Traffic Characterization*, Proceedings ITC, 2003.

[2] Alexander Shapiro, Shabbir Ahmed, *On a class of minimax stochastic programs*, Optimization Online, Accepted August 2003

[3] Shabbir Ahmed, Alan J. King, Gyana Parija, *A Multi-stage Stochastic Integer Programming Approach for Capacity Expansion under Uncertainty*, Optimization Online, Entry Submitted February 2001, Entry Accepted May 2001

[4] Alexander Shapiro, Arkadi Nemirovski, *On complexity of stochastic programming problems*, Optimization Online, Entry Submitted: October 2004 Entry Accepted: October 2004

[5] Dimitris Bertsimas, Aurelie Thiele, *Robust and Data-Driven Optimization: Modern Decision-Making Under Uncertainty*, Optimization Online, Entry accepted May 2006

[6] Melvyn Sim, Xin Chen, Peng Sun, *A Robust Optimization Perspective of Stochastic Programming*, Optimization Online, Accepted June 2005

[7] Melvyn Sim, *Robust Optimization*, PhD Thesis submitted at the Sloan School of Management, June 2004

[8] Aharon Ben-Tal, Arkadi Nemirovski, *Robust optimization—methodology and applications*, Published Online, Feb. 14, 2002 © Springer-Verlag 2002

[9] H.-S. GAN and A. WIRTHy, *Comparing deterministic, robust and online scheduling using entropy*, International Journal of Production Research, Accepted November 2004

[10] Rajesh Piplani a,*, Dennis Wetjens, *Evaluation of entropy-based dispatching in flexible manufacturing systems*, European Journal of Operational Research, Accepted 30 Jun. 2005

[11] ANDREAS BUJA 1 and DEBORAH F. SWAYNE 2, *Visualization Methodology for Multidimensional Scaling*, CiteSeer, Published Dec. 17, 2001

[12] Woonghee Tim Huh and Robin .O. Roundy, *Using Auctions for Procurement*, School of Operation Research and Industrial Engineering, Cornell University, Oct. 16, 2002

[13] Jean .B. Lasserre and Eduardo S. Zeron, *A Laplace Transform Algorithm for the Volume of a Convex Polytope*, Journal of the ACM, Vol. 48, No. 6, November 2001, pp. 1126-1140.

[14] Thomas L. Saaty, *Fundamentals of Decision Making and Priority Theory With The AHP or Analytic Hierarchy Process*

We claim:

1. A robust method for solving in a programmed computer, optimization problems under uncertainty applicable to supply chain management in a multi-commodity, time-dependent setting having (i) one or more objective functions, each of the objective functions having one or more constraints, wherein the number of non-positivity constraints is typically smaller than the number of parameters, with one or more classes of uncertainty, (ii) input data represented in one or more ensembles with inputs being specified in one or more stages (iii) parameters based on the ensembles, (iv) one or more assumptions about a future, and (v) quantitative estimates of information within the input data and one or more solutions being generated by:
 a. Specifying the uncertainty as a hierarchical series of sets of constraints on parameters, with the parameters restricted to a constraint set forming an ensemble, and the hierarchy of constraints, represented as mathematical sets forming a hierarchy of ensemble, said hierarchy being based on subset, intersection or disjoint relationships by creating an ensemble with a specific optimal structure for supply chain management including nominal values for variables such as demand and input, the hierarchical series of sets of constraints on parameters represented in a storage element;
 b. Utilizing optimization techniques to identify minimum and maximum bounds on each objective function, said bounds depending on the constraints comprising each ensemble of parameters and being computed for each of the assumptions about the future, the maximum and minimum bounds on each objective function represented in the storage element;
 c. Estimating a volume of candidate ensembles and relating the volume to one or more information theoretic measures;
 d. Utilizing information theoretic measures to analyze and iteratively refine the ensembles by changing a specificity of the bounds on the objective function;
 e. using a processor to perform transformations on the supply chain management structure to simulate perturbations on the variables within the optimal structure; and
 f. Maximizing or minimizing for a particular variable within the supply chain structure using linear programming.

2. The method of claim 1 wherein one or more objective functions co-exist and are both linear and non-linear.

3. The method of claim 1 wherein transformations include orthogonal translations and volume preserving translations.

4. The method of claim 1 wherein the constraints include:
 a. Constraints on supplier capacity;
 b. Constraints on market capacity;
 c. Constraints on storage capacity;
 d. Constraints on production capacity;
 e. Constraints on edge capacity;
 f. Constraints on costs;
 g. Constraints on structural capacity;
 h. Constraints on inventory; and
 i. Constraints on time.

5. The method of claim 1 wherein the objective functions include total cost of the chain, cycle time, revenue earned, inventory levels, production levels and capacities of different components of the chain.

6. The method of claim 1 wherein the classes of uncertainty include:
 a. Demand uncertainty which is represented constraints on one or more variables, which are external to the supply chain structure;
 b. Supply Chain uncertainty; and
 c. Market uncertainty.

7. The method of claim 6 wherein the Demand uncertainty is represented using:
 a. Bounds on the minimum and maximum values on each demand variable;
 b. Bounds on the sums or the differences of demands, representing aggregated demand or competitive demand respectively; and
 c. Bounds on weighted sums or weighted differences of demands representing revenues or profits respectively.

8. The method of claim 6 wherein the Supply Chain uncertainty is represented using:
 a. Individual Capacity of Nodes that represent a set of production sites, or links that represent communication facilities;
 b. Aggregated Capacity of Nodes that represent a set of production sites, or links that represent a set of communication facilities;

c. Tracking capacity of Nodes or Links where the capacity of some nodes or links may be related; and
d. A set of candidate structures for the supply chain being modeled.

9. The method of claim 6 wherein the Market uncertainty is represented using:
a. Total Demand over time; and
b. Regional aggregation constraints.

10. A robust method for solving in a programmed computer, optimization problems under uncertainty applicable to Analytical Hierarchical Processing (AHP) that enables a robust representation of the optimization problem, each optimization problem having (i) one or more objective functions, each of the objective functions having one or more constraints, wherein the number of constraints is typically smaller than the number of parameters, with one or more classes of uncertainty, (ii) input data represented in one or more ensembles with inputs being specified in one or more stages (iii) parameters based on the ensembles, (iv) one or more assumptions about a future, and (v) quantitative estimates of information within the input data and one or more outputs to obtain one or more ranking given one or more options depending on one or more qualitative or quantitative criteria, information being delineated into a hierarchy of criteria and alternatives comprising the steps of:

specifying the uncertainty as a hierarchical series of sets of constraints on parameters, with the parameters restricted to each constraint set forming an ensemble, and the hierarchy of constraints, represented as mathematical sets forming a hierarchy of ensembles, said hierarchy being based on subset, intersection or disjoint relationships amongst them, the hierarchical series of sets of constraints on parameters represented in a storage element;

utilizing a processor executing optimization techniques to create effective minimum and maximum bounds on each objective function, said bounds depending on the constraints in each ensemble of parameters and being generated responsive to each assumption about the future, the effective minimum and maximum bounds on each objective function represented in the storage element;

estimating, with the processor, a volume of candidate ensembles and relating the volume to one or more information theoretic measures;

utilizing the one or more information theoretic measures to analyze and improve the ensembles and associated stages by changing a specificity of the bounds on the objective function, the ensembles and information theoretic measures represented in a storage element;

obtaining relative ratios and alternatives for each criteria; and generating a random matrix to satisfy a constraint set.

11. A robust method for solving in a programmed computer, optimization problems under uncertainty applicable to Auctions, which rely on a valuation benefit function that enables a robust representation of the optimization problem, each optimization problem having (i) one or more objective functions, each of the objective functions having one or more constraints, wherein the number of non-positivity constraints is typically smaller than the number of parameters, with one or more classes of uncertainty, (ii) input data represented in one or more ensembles with inputs being specified in one or more stages (iii) parameters based on the ensembles, (iv) one or more assumptions about a future, and (v) quantitative estimates of information within the input data to measure the benefit derived by acquiring a good of some kind, the method comprising:

specifying the uncertainty as a hierarchical series of sets of constraints on parameters, with the parameters restricted to each constraint set forming an ensemble, and the hierarchy of constraints, represented as mathematical sets forming a hierarchy of ensembles, said hierarchy being based on subset, intersection or disjoint relationships amongst them, the hierarchical series of sets of constraints on parameters represented in a storage element;

utilizing a processor executing optimization techniques to create effective minimum and maximum bounds on each objective function, said bounds depending on the constraints in each ensemble of parameters and being generated responsive to each assumption about the future;

estimating, with the processor, a volume of candidate ensembles and relating the volume to one or more information theoretic measures; and utilizing the one or more information theoretic measures to analyze and improve the ensembles and associated stages by changing a specificity of the bounds on the objective function.

12. A robust method for solving in a programmed computer, optimization problems under uncertainty applicable to Analytical Hierarchical Processing (AHP) that enables a robust representation of the optimization problem, each optimization having (i) one or more objective functions, each of the objective functions having one or more constraints, wherein the number of constraints is typically smaller than the number of parameters, with one or more classes of uncertainty, (ii) input data represented in one or more ensembles with inputs being specified in one or more stages (iii) parameters based on the ensembles, (iv) one or more assumptions about a future, and (v) quantitative estimates of information within the input data and one or more outputs to obtain one or more ranking given one or more options depending on one or more qualitative or quantitative criteria, information being delineated into a hierarchy of criteria and alternatives further comprising the steps of:

specifying the uncertainty as a hierarchical series of sets of constraints on parameters, with the parameters restricted to each constraint set forming an ensemble, and the hierarchy of constraints, represented as mathematical sets forming a hierarchy of ensembles, said hierarchy based on subset, intersection or disjoint relationships amongst them, the hierarchical series of sets of constraints on parameters represented in a storage element;

utilizing optimization techniques in the programmed computer to identify minimum and maximum bounds on each objective function, said bounds depending on the constraints in each ensemble of parameters and computed for each of the assumptions;

estimating a volume of candidate ensembles and relating the volume to one or more information theoretic measures;

utilizing the one or more information theoretic measures to analyze and iteratively refine the ensembles with the programmed computer by changing a specificity of said bounds on the objective function;

obtaining relative ratios and alternatives for each criteria; and generating a random matrix with the programmed computer to satisfy a constraint set.

13. A computer program product embodied in a non-transitory computer-readable medium containing software code loadable into the internal memory of a computer having (a) a core part including logic; (b) a user interface to enable input and output to the user; and (c) a system interface to facilitate interaction of the core part with one or more software packages, applicable to Supply Chain Management in a multi-commodity, time-dependent setting wherein the number of constraints is typically smaller than the number of parameters, with one or more classes of uncertainty, with inputs being specified in one or more stages, having (i) one or more objective functions, each of the objective functions having one or more constraints, wherein the number of non-positivity constraints is typically smaller than the number of parameters, with one or more classes of uncertainty, (ii) input data represented in one or more ensembles over parameters with inputs being specified in one or more stages (iii) one or more assumptions about a future, and (v) quantitative estimates of information within the input data and one or more solutions being generated by:
   a. An interface configured to receive a hierarchical series of sets of constraints on parameters, with the parameters restricted to a constraint set forming an ensemble, and the hierarchy of constraints, represented as mathematical sets forming a hierarchy of ensemble, said hierarchy being based on subset, intersection or disjoint relationships by creating an ensemble with a specific optimal structure for supply chain management including nominal values for variables such as demand and input obtained in real-time by the computer;
   b. A constraint manager which utilizes optimization techniques to identify minimum and maximum bounds on each objective function, said bounds depending on the constraints comprising each ensemble of parameters and being computed for each of the assumptions about the future;
   c. An interface configured to display a volume metric of candidate ensembles and relating the volume to one or more information theoretic measures;
   d. logic responsive to information theoretic measures that adjusts the ensembles by changing the specificity of bounds on the objective function;
   e. logic arranged to quantify the amount of uncertainty in one or more constrained sets of parameters by identifying volume of constraint regions as information content;
   f. logic arranged to generate a tree of solutions by modifying constraints wherein solutions obtained under supersets of constraints are children of solutions obtained under their subsets;
   g. logic arranged to compute the degree of variation of outputs keeping the total input volume and uncertainty the same;
   h. logic arranged to transform the supply chain management structure to simulate perturbations on the variables within the optimal structure; and
   i. logic arranged to maximize or minimize a particular variable within the supply chain structure using linear programming.

14. The computer program product of claim 13 wherein one or more objective functions co-exist, and are both linear and non-linear.

15. The computer program product of claim 13 wherein transformations include orthogonal translations and volume preserving translations.

16. The computer program product of claim 13 wherein the constraints include:
   a. Constraints on supplier capacity;
   b. Constraints on market capacity;
   c. Constraints on storage capacity;
   d. Constraints on production capacity;
   e. Constraints on edge capacity;
   f. Constraints on costs;
   g. Constraints on structural capacity;
   h. Constraints on inventory; and
   i. Constraints on time.

17. The computer program product of claim 13 wherein the objective functions include total cost of the chain, cycle time, revenue earned, inventory levels, production levels and capacities of different components of the chain.

18. The computer program product of claim 13 wherein the classes of uncertainty include:
   a. Demand uncertainty which is represented constraints on one or more variables, which are external to the supply chain structure;
   b. Supply Chain uncertainty; and
   c. Market uncertainty.

19. The computer program product of claim 18 wherein the Demand uncertainty is represented using:
   a. Bounds on the minimum and maximum values on each demand variable;
   b. Bounds on the sums or the differences of demands, representing aggregated demand or competitive demand respectively; and
   c. Bounds on weighted sums or weighted differences of demands representing revenues or profits respectively.

20. The computer program product of claim 18 wherein the Supply Chain uncertainty is represented using:
   a. Individual Capacity of Nodes that represent a set of production sites, or links that represent communication facilities;
   b. Aggregated Capacity of Nodes that represent a set of production sites, or links that represent a set of communication facilities;
   c. Tracking capacity of Nodes or Links where the capacity of some nodes or links may be related; and
   d. A set of candidate structures for the supply chain being modeled.

21. The computer program product of claim 18 wherein the Market uncertainty is represented using:
   a. Total Demand over time; and
   b. Regional aggregation constraints.

22. A computer program product embodied in a non-transitory computer-readable medium containing software code loadable into the internal memory of a computer having (a) a core part including logic; (b) a user interface to enable input and output to the user; and (c) a system interface to facilitate interaction of the core part with one or more software packages, applicable to Analytical Hierarchical Processes, wherein the number of constraints is typically smaller than the number of parameters, with one or more classes of uncertainty, with inputs being specified in one or more stages, having (i) one or more objective functions, each of the objective functions having one or more constraints, wherein the number of constraints is typically smaller than the number of parameters, with one or more classes of uncertainty, (ii) input data represented in one or more ensembles with inputs being specified in one or more stages (iii) parameters based on the ensembles, (iv) one or more assumptions about a future, and (v) quantitative estimates of information within the input data to obtain a one or more rankings being generated by:
   a. An interface configured to receive a hierarchical series of sets of constraints on parameters, with the parameters restricted to a constraint set forming an ensemble, and the hierarchy of constraints, represented as mathematical sets forming a hierarchy of ensemble, said hierarchy being based on subset, intersection or disjoint relationships by creating an ensemble with a specific optimal structure for supply chain management including nominal values for variables such as demand and input obtained in real-time by the computer;

b. A constraint manager which utilizes optimization techniques to identify minimum and maximum bounds on each objective function, said bounds depending on the constraints comprising each ensemble of parameters and being computed for each of the assumptions about the future;

c. An interface configured to display a volume metric of candidate ensembles and relating the volume to one or more information theoretic measures;

d. logic responsive to information theoretic measures that adjusts the ensembles by changing the specificity of bounds on the objective function;

e. logic arranged to quantify the amount of uncertainty in one or more constrained sets of parameters by identifying volume of constraint regions as information content;

f. logic arranged to generate a tree of solutions by modifying constraints wherein solutions obtained under supersets of constraints are children of solutions obtained under their subsets;

g. logic arranged to compute the degree of variation of outputs keeping the total input volume and uncertainty the same;

h. an interface arranged to receive user-specified relative ratios and alternatives for each criteria; and i. logic arranged to generate a random matrix to satisfy a constraint set specified by the user.

23. A computer program product embodied in a non-transitory computer-readable medium containing software code loadable into the internal memory of a computer having (a) a core part including logic; (b) a user interface to enable input and output to a user; and (c) a system interface to facilitate interaction of the core part with one or more software packages, applicable to Auctions, wherein the number of constraints is typically smaller than the number of parameters, with one or more classes of uncertainty, with inputs being specified in one or more stages, having (i) one or more objective functions, each of the objective functions having one or more constraints, wherein the number of constraints is typically smaller than the number of parameters, with one or more classes of uncertainty, (ii) input data represented in one or more ensembles with inputs being specified in one or more stages (iii) parameters based on the ensembles, (iv) one or more assumptions about a future, and (v) quantitative estimates of information within the input data, wherein the auctions rely on a valuation benefit function, which measures the benefit being generated by:

a. An interface configured to receive a hierarchical series of sets of constraints on parameters, with the parameters restricted to a constraint set forming an ensemble, and the hierarchy of constraints, represented as mathematical sets forming a hierarchy of ensemble, said hierarchy being based on subset, intersection or disjoint relationships by creating an ensemble with a specific optimal structure for supply chain management including nominal values for variables such as demand and input obtained in real-time by the computer;

b. A constraint manager which utilizes optimization techniques to identify minimum and maximum bounds on each objective function, said bounds depending on the constraints comprising each ensemble of parameters and being computed for each of the assumptions about the future;

c. An interface configured to display a volume metric of candidate ensembles and relating the volume to one or more information theoretic measures;

d. logic responsive to information theoretic measures to analyze and iteratively refine the ensembles by changing the specificity of bounds on the objective function;

e. logic arranged to quantify the amount of uncertainty in one or more constrained sets of parameters by identifying volume of constraint regions as information content;

f. logic arranged to generate a tree of solutions by modifying constraints wherein solutions obtained under supersets of constraints are children of solutions obtained under their subsets;

g. logic arranged to compute the degree of variation of outputs keeping the total input volume and uncertainty the same;

h. an interface arranged to receive user-specified relative ratios and alternatives for each criteria; and i. logic arranged to generate a random matrix to satisfy a constraint set specified by the user.

24. The method of claim 1 wherein the information theoretic measures are based on the number of bits present in the ensemble.

25. The method of claim 1 wherein the optimization techniques are consistent with the constraints and the objective function including:

Linear Programming or second-order cone programming.

* * * * *